United States Patent
Fu et al.

(10) Patent No.: US 10,378,147 B2
(45) Date of Patent: Aug. 13, 2019

(54) PRETREATING AGENT TO IMPROVE THE EFFECT OF INK-JET PRINTING ON POLYESTER FABRIC AND ITS APPLICATION

(71) Applicant: Jiangnan University, Wuxi (CN)

(72) Inventors: Shaohai Fu, Wuxi (CN); Min Li, Wuxi (CN); Liping Zhang, Wuxi (CN); Ying Zhao, Wuxi (CN); Ying Tan, Wuxi (CN); Anli Tian, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 15/801,696

(22) Filed: Nov. 2, 2017

(65) Prior Publication Data

US 2018/0171549 A1 Jun. 21, 2018

(30) Foreign Application Priority Data

Dec. 16, 2016 (CN) .......................... 2016 1 1166114
Dec. 16, 2016 (CN) .......................... 2016 1 1166147

(51) Int. Cl.
| | | |
|---|---|---|
| *D06P 5/22* | (2006.01) | |
| *D06P 5/30* | (2006.01) | |
| *D06P 1/06* | (2006.01) | |
| *D06P 1/62* | (2006.01) | |
| *D06M 11/13* | (2006.01) | |
| *D06M 11/45* | (2006.01) | |
| *D06M 11/46* | (2006.01) | |
| *D06P 3/54* | (2006.01) | |
| *B82Y 30/00* | (2011.01) | |

(52) U.S. Cl.
CPC .............. *D06P 5/22* (2013.01); *D06M 11/13* (2013.01); *D06M 11/45* (2013.01); *D06M 11/46* (2013.01); *D06P 1/06* (2013.01); *D06P 1/62* (2013.01); *D06P 3/54* (2013.01); *D06P 5/30* (2013.01); *B82Y 30/00* (2013.01)

(58) Field of Classification Search
CPC .......... B41M 5/52; B41M 5/5218; B41J 2/01; D06P 5/30; B82Y 30/00; B32Y 30/00
USPC .................... 428/32.34, 32.36, 32.37, 32, 37
See application file for complete search history.

(56) References Cited

U.S. PATENT DOCUMENTS

2008/0160232 A1* 7/2008 Sasaguri et al. ......... B41M 5/40
428/32.33

FOREIGN PATENT DOCUMENTS

KR 20070083432 * 8/2007 .............. B41M 5/00

* cited by examiner

*Primary Examiner* — Gerard Higgins
(74) *Attorney, Agent, or Firm* — Na Xu; IPro, PLLC

(57) ABSTRACT

The present invention provides a novel pretreating agent to improve the effect of ink-jet printing on polyester fabric and its application, and this invention belongs to the field of digital ink-jet printing. Stirring the dispersing agent, which includes many procedures of wetting agent and deionized water in a stirrer, adding nano-porous oxide dispersoid. Furthermore, keep stirring for 30 min and put the mixture in a sand mill to grinded for 2 h, then nano-porous oxide dispersoid is eventually got. The nano-porous oxide dispersoid work as pretreating agent, which used in the polyester fabric, is treated like pretreating agent during the padding process. By applying this technique into double-sided permeation ink-jet printing and direct-injection ink-jet printing, its pattern's definition, color depth and color saturation could be remarkable enhanced. This method has many advantages such as the craft is easy to handle as well as the operation is simplified, it is also suitable for batch production of the polyester fabric.

7 Claims, No Drawings

PRETREATING AGENT TO IMPROVE THE EFFECT OF INK-JET PRINTING ON POLYESTER FABRIC AND ITS APPLICATION

CROSS-REFERENCES AND RELATED APPLICATIONS

This application claims the benefit of priority to Chinese Application No. 201611166114.9, entitled "A pretreatment method for improving the definition of direct-injection ink-jet printing on the polyester fabric", filed Dec. 16, 2016, Chinese Application No. 201611166147.3, entitled "A pretreatment method for improving the effect of double-sided permeation ink-jet printing on polyester fabric", filed Dec. 16, 2016, which are herein incorporated by reference in its entirety.

TECHNICAL FIELD

The present invention relates to the field of digital ink-jet printing, and more particularly relates to a novel pretreating agent to improve the effect of ink-jet printing on polyester fabric and its application.

BACKGROUND

Compared to the traditional printing, digital ink-jet printing had a lot of advantages such as low energy consumption, economize dye, clear patterns and so on, it also could satisfy the market's requirement such as individuation production, small batch production, and fast reaction. Therefore, at present, the digital ink-jet printing has attracted much attention. Direct-injection ink-jet printing, as one of the ink-jet printing method, is suitable for double-sided printing and single-sided printing respectively.

The cloth for double-sided clothing, silk broadcloth, reversible jacket and shirt, kerchief, banners and advertisement flags all need to be double-sided printed by ink-jet printing technology. We hope both sides of the double-sided printed fabric display the same patterns in shape, definition, color depth and colour saturation. Therefore, the pretreating agent used in double-sided permeation ink-jet printing process should help to transfer the ink from fabric's one side to another side and prevent the ink from spreading beyond the target printing area at the same time. However, there are still questions about double-sided permeation ink-jet printing using direct-injection ink-jet printing method. Ink always diffuse along the polyester fabric's longitude and latitude lines due to the low viscosity of the ink and the lack of hydrophilic groups on polyester fabric surface, which results in edge blurriness and poor definition. In order to solve these problems, the pretreatment of fabric prior to printing is crucial for the polyester fabric.

The research of double-sided permeation ink-jet printing of polyester fabric around the world focused on two aspects: (1) Application of alkali-treatment to turn polyester fabric into silk-like fabric. Just like the technique which created by Guan-xiu Jin and her partners, they used the mixed thickener EW-50, APS and resist S to treat the fabric which had been processed by alkali-treatment. Then transfer printing was carried out. By applying this kind of technique, the color depth of the reversed side of the fabric reached more than 75% of the front side, and the printing definition was more than 80%. CN01906712A showed an advanced production method of silk-imitation polyester fabric due to reducing amount of alkali, therefore, this technique can reduce sewage disposal and save raw material. But it's application was limited to some polyester fabric. (2) In addition to infiltrative colorant and thickener, penetrant were also added into the traditional printing color thick liquid for the flat screen printing or platform printing. For example, CN 104762832A published a method to make a kind of permeated print fabric by adding penetrated resin, bridging agent, chemical accelerant and dimethylformamide, and then the fabric was dried under specific move speed, temperature and pressure. Another example was CN 104562796A, which published a color paste formula containing penetrant. However, the fabric had a fishy smell due to introducing penetrant. At the same time, printing quality was poor due to the static electricity The research of the pretreatment in order to enhancing the sharp definition of single-sided direct ink-jet printing mainly focused on 3 aspects: (1) Padding polymer on fabric's surface to weaken the fabric's penetrability. For example, CN101736606A published a technique that using $\beta$-cyclodextrin as pretreatment agent to increase the fabric's ability to embrace ink, which lead to improve the patterns definition. Yongping Lou researched the relationship beTween the types of thickener and polyester fabric's printing definition. Jinglan Yang researched the effect of methyl cellulose (CMC), sodium alginate, polyethylene glycol (PEG) and polyoxyethylene (PEO) on the printing sharpness of ink-jet printing. The PEG and PEO could obviously enhance the fixation rate of ink on the fabric's surface, but CMC and sodium alginate didn't have little effect on fixation rate. Nevertheless, more thickener and high polymer used could give a negative influence to the hand feeling of the printed fabric; (2) The polyester fabric was treated by catiomic reagent in cationic treatment process, this method used positive charges to attract the ink and enhance its fixation which could weak the penetrability. Just like the patent CN102071574A published a technique that used the quaternized chitosan as the pretreating agent to refine the fabric's ink print's definition and colour depth. It also made the fabrics antibacterial, But this method could only be applied on normal kind of dye typed fabric print; (3) Changing the polyester fabric's hydrophilic properties to improve its water-holding ability. For example, plasma technique and high energy ray irradiation technique were used to improve printing definition. But the requirements for equipment and operation were higher and it's not a cost-effective way, so it could not be used in a batch of polyester fabric processing work.

SUMMARY

The goal of the present invention is to provide a novel pretreating agent to improve the printing quality polyester fabric. The novel pretreating agent used in double-sided permeation printing could enhance the ink's permeation from fabric's one side to another side and prevent the ink from spreading beyond the target printing area at the same time. The pretreating agent used in single-sided direct-injection ink-jet printing can enhance the polyester fabric's water-retaining property and antistatic ability and improve pattern definition due to ink permeation and electrostatic action for the direct-injection ink-jet printing.

The present invention provides a novel pretreating agent for polyester fabric: the nano-porous silicon dioxide dispersoid, antistatic agent, thickening agent, wetting agent and water are mixed together according to a certain percentage, mix all the chemical compound well to get a novel pretreating agent.

In one embodiment of the present invention, the pretreating agent for polyester fabric is consist of 10-50% nano-porous oxide dispersoid, 1-4% antistatic agent, 1-5% thickening agent, 1-5% wetting agent, the rest is filled up to 100% by water. All the materials' percentage are calculated by mass fractions.

In one embodiment of the present invention, the pretreating agent is consist of 10-20% nano-porous oxide dispersoid, 1-2% antistatic agent, 2-5% thickening agent, 3-5% wetting agent, the rest is filled up to 100% by water. All the materials' percentage are calculated by mass fractions.

Furthermore, the pretreating agent can be classified into two types, Type I and Type II, which there are a little difference in the composition and preparation method of nano-porous oxide dispersoid. Type I and Type II are suitable for double-sided permeation ink-jet printing and single-sided direct-injection ink-jet printing respectively. The pretreating agent Type I can help to migrate the ink from fabric's one side to another side and prevent the ink permeation beyond the target printing area at the same time. While the pretreating agent Type II can prevent the ink migrated from fabric's one side to another side and ink spreading beyond the target printing area at the same time.

In one embodiment of the present invention, the pretreating agent Type I is applied to double-sided permeation ink-jet printing.

In one embodiment of the present invention, the preparation method for nano-porous oxide dispersoid of pretreating agent Type I includes the following steps: (1) dissolving non-ionic dispersant and wetting agent into deionized water, and the mass fraction of non-ionic dispersant to nano-porous oxide dispersoid is 10-30% and the mass fraction of wetting agent to nano-porous oxide dispersoid is 1-5%, (2) adding nano-porous oxide the mixture obtained in step (1), the mass fraction of nano-porous oxide to nano-porous oxide dispersoid is 20-30%, (3) stirring well, and dispersing the mixture in sand mill to prepare nano-porous silicon dioxide dispersoid whose average size<200 nm; the non-ionic dispersant may be one or more of polyoxyethylene fatty acid, polyoxyethylated amide, polyhydric alcohols, sorbitan esters, S-465, TMN-6, Tween 60, Tween 65, Tween80, Triton X-100, Triton X-10, span-20, span-40, span-60, span-80, peregal OS-15, peregal A-20, peregal AEO-10, polyethylene oxide (PEO) and polyvinyl pyrrolidone (PVP); the wetting agent is anionic dispersant, which may be one or more of sodium dodecyl benzene sulfonate (SDBS), sodium(C16-)alkylsulfonate, sodium(C18-)alkylsulfonate, alkylphenol polyoxyethylene ether sodium sulfate, sodium lauryl polyoxyethylene ether carboxylate and alkyl sodium sulfonate; the nano-porous oxide may be nano-porous silicon dioxide, nano-porous titanium dioxide or nano-porous aluminium dioxide.

In one embodiment of the pretreating agent Type I, the mass fraction of nano-porous oxide in the nano-porous oxide dispersoid is 20%.

In one embodiment of the pretreating agent Type I, the antistatic agent is non-ionic surface-active agent, such as antistatic agent F-16 and antistatic agent Z-25; the antistatic agent may be also anion surfactant, such as alkane sulfonate, alkyl sulfate, alkyl phosphate, alkyl polyoxyethylene sulfate and so on.

In one embodiment of the pretreating agent Type I, the thickener is nonionic thickener including alkylphenol ether thickener, ammonia ester thickener, polyving akohol, polyoxyethylene thickener and so on.

In one embodiment of the pretreating agent Type I, the wetting agent is anionic dispersant, which may be one or more of (SDBS), sodium(C16-)alkylsulfonate, sodium(C18-)alkylsulfonate, alkylphenol polyoxyethylene ether sodium sulfate, alkyl polyoxyethylene ether carboxylate, alkyl sodium sulfonate.

In one embodiment of the pretreating agent Type I, the pretreating agent Type I can be applied by following way: (1) attaching pretreating agent Type I on the surface of polyester fabric by padding process, (2) drying the polyester fabric, (3) then implementing the ink-jet printing to get double-sided printed polyester fabric.

In one embodiment of the application of pretreating agent Type I, it still includes sublimation and fixation.

In one embodiment of the application of pretreating agent Type I, the rolling rate during padding is controlled at 60-100%, pre-baking temperature is 60° C., baking temperature is 100-150° C.

In one embodiment of the present invention, pretreating agent Type II is applied to single-sided direct-injection ink-jet printing.

In one embodiment of the pretreating agent Type II, it is consist of 30-40% nano-porous oxide dispersoid, 2% antistatic agent, 2-3% thickening agent, 2-3% wetting agent, the rest is filled up to 100% by water. All the materials' percentage are calculated by mass fractions.

In one embodiment of the pretreating agent Type II, the preparation method for nano-porous oxide dispersoid of pretreating agent Type II includes the following steps: (1) dissolving cationic dispersant and wetting agent into deionized water, and the mass fraction of nano-porous oxide dispersoid to nano-porous oxide dispersoid is 10-30% and the mass fraction of wetting agent to nano-porous oxide dispersoid is 1-5%; (2) adding nano-porous oxide whose mass fraction is 20-30% of nano-porous oxide dispersoid; (3) stirring well, dispersing the mixture in sand mill to get nano-porous silicon dioxide dispersoid whose average size<200 nm; the cationic dispersant may be one or two types of epoxypropyl trimethyl ammonium chloride (EPTMAC), epoxypropyl triethyl ammonium chloride, 3-chlorohydroxypropyltrimethylammonium chloride, acryloyloxyethyl trimethyl ammonium chloride, methacryloyloxyethyl trimethyl ammonium chloride, 2-ethoxy-double trimethyl ammonium chloride, 2 hydroxy ethyl trimethyl ammonium chloride; the wetting agent is non-ionic dispersant which may be one or more types of Tween 60, Tween 65, Tween80, Triton X-100, Triton X-10, span-20, span-40, span-60, span-80, peregal OS-15, peregal A-20, peregal AEO-10, PEO, PVP; the nano-porous oxide may be nano-porous silicon dioxide, nano-porous titanium dioxide or nano-porous aluminium dioxide.

In one embodiment of the pretreating agent Type II, the mass fraction of nano-porous oxide in the nano-porous oxide dispersoid is 20%.

In one embodiment of the pretreating agent Type II, the antistatic agent is amine salt type cationic surfactant, such as antistatic agent TM, antistatic agent SN and PECH-NNDMA; the antistatic agent may be amine oxide cationic surface active agent; the antistatic agent could be imidazoline hyamine ramification, including antistatic crumb softener AS; the antistatic agent also could be fatty acid amine antistatic, including N, N-dimethyl-β-ethoxyl-octdecannamide-γ-propyl quaternary ammonium nitrate.

In one embodiment of the pretreating agent Type II, the wetting agent may be one or more types of Tween 60, Tween 65, Tween80, Triton X-100, Triton X-10, span-20, span-40, span-60, span-80, peregal OS-15, peregal A-20, peregal AEO-10, PEO, PVP.

In one embodiment of the pretreating agent Type II, the thickener may be nonionic thickener including alkyl phenol polyether thickener, ammonia ester thickener, polyving akohol, polyoxyethylene thickener.

In one embodiment of the pretreating agent Type II, the pretreating agent Type II can be applied by following way: (1) attaching the pretreating agent on the surface of polyester fabric through padding process, (2) drying the polyester fabric, (3) then implementing the ink-jet printing to get single-sided printed polyester fabric.

In one embodiment of the application of pretreating agent Type II, the rolling rate during padding is controlled in 60-100%, pre-baking temperature is 60° C., baking temperature is 100-150° C.

The invention aims at solving poor definition of polyester fabric for digital ink-jet printing. A novel pretreating agent containing nano-porous material and antistatic agent is provided to improve the pattern definition that printed by digital ink-jet printing on polyester fabric, and there is an obvious improvement on pattern definition, colour depth and colour saturation. The method has advantages of easy process, convenient operation, environmentally-friendly, it is also suitable to batch production for the polyester fabric.

DETAILED DESCRIPTION

Materials and Methods:
  Measuring Method:
  (1) Definition Test

The printed line width was set 1 mm on printing machine, a metallographic video microscope was used to shoot the printed line at magnification of 50. Using the software of ToupView to test the width of printed line's maximum permeate place.

(2) Test the Ratio of K/S

The fabric's pattern was measured by blendent test machine computer CI7800, in the CIE Lab system, testing both sides of fabric's K/S and C* at the condition of D65 illuminant and 10° angle of view. Each sample was measured 3 times and calculated the average value.

(3) Permeate Ratio Test

The blendent test machine computer C17800 were used to measure the both side of fabric's K/S, using the following formula to calculate the Permeate ratio:

$$\text{permeate} = \frac{B}{F} \times 100\%$$

B—the back side of the fabric's $K/S$;
F—the facade side of fabric's $K/S$ (4) Antistatic Test The electrostatic pressure and its half-life period of the samples before and after the treatment were respectively tested by inductive static determinator (YG(B)342D). The test condition: environment temperature is 37° C., relative humidity is 58%.

(5) Fabric's Breaking Strength Test

The breaking strength of the samples before and after the treatment were tested respectively by YG(B)026D-250 type electronic.

Example 1

110 g/m² warp-knitted polyester fabric was selected as sample, employing the process as follows:

(1) Preparation of the nano-porous silicon dioxide dispersion: 12 g TMN-6, 2 g SDBS, 146 g deionized water, mix and stir the above materials evenly in a stirrer, adding 40 g nano-porous silicon dioxide, keep stirring for 30 min, put the mixture in a sand mill and grinded for 2 h; then nano-porous silicon dioxide dispersoid that contain 20% nano-porous silicon dioxide and the average size<200 nm was got;

(2) Preparation of the pretreating solution: 20 g nano-porous silicon dioxide dispersoid, 4 g antistatic agent Z-25, 10 g polyving akohol, 6 g SDBS, 160 g deionized water, stir the above materials in a stirrer and its speed is 800-1000 r/min, keep stirring for 30 min, then the fabric pretreating solution was got;

(3) Padding pretreating solution: the polyester fabric was dipped into the pretreating bath, and squeezed with 60-100% liquid rate;

(4) Pre-dried and baking: the fabric was pre-dried at 60° C. and followed by 200° C. baking;

(5) Ink-jet printing: the water-based disperse dyes ink was used to printing under the condition of 720×540 dpi and 3 Pass;

(6) Sublimation and fixation: sublimation and fixation at 180° C. for 1 min.

TABLE 1

| | The properties of fabric before and after the treatment | | | | | | | | |
|---|---|---|---|---|---|---|---|---|---|
| Samples | Fabric direction | Width/mm | Pros and cons | K/S | C* | Permeation-ratio/% | Electrostatic pressure/V | Half life/s | Breaking strength/N |
| Untreated | Wale | 1.48 | facade | 5.19 | 34.23 | 95.8 | 725 | 2.13 | 403 |
| | Course | 1.23 | back | 4.97 | 33.68 | | | | 776 |
| Treated | Wale | 1.23 | facade | 9.25 | 35.40 | 83.2 | 577 | 0.89 | 412 |
| | Course | 1.05 | bake | 7.70 | 34.69 | | | | 769 |

Table 1 showed that the properties of fabric before and after the treatment. It can be found that although the permeation ratio of fabrics reduced, the color of fabric front is similar to fabric back. The definition, colour depth, colour saturation and of antistatic ability pretreated fabrics were improved compared with untreated fabrics, while their breaking strength barely changed.

Example 2

180 g/m² warp-knitted polyester fabric was selected as sample, employing the process as follows:

(1) Preparation of the nano-porous silicon dioxide dispersion: 12 g TMN-6, 2 g SDBS, 146 g deionized water, mix and stir the above materials evenly in a stirrer, add 40 g nano-porous silicon dioxide, keep stirring for 30 min, put the mixture in a sand mill and grinded for 2 h; then the nano-porous silicon dioxide dispersoid that contain 20% nano-porous silicon dioxide and the average size<200 nm was got;

(2) Preparation of the pretrating solution: 40 g nano-porous silicon dioxide dispersoid, 4 g antistatic agent Z-25, 4 g polyving akohol, 6 g SDBS, 146 g deionized water, stir the above materials in a stirrer and its speed is 800-1000 r/min, keep stirring for 30 min, then the pretrating solution was got;

(3) Padding pretrating solution: the polyester fabric was dipped into the pretreating bath, and squeezed with 60-100% liquid rate;

(4) Pre-dried and baking: the fabric was pre-dried at 60° C. and followed by 200° C. baking;

(5) Ink-jet printing: the water-based disperse dyes ink was used to printing under the condition of 720×540 dpi and 3 Pass;

(6) Sublimation and fixation: sublimation and fixation at 180° C. for 1 min.

TABLE 2

The properties of fabric before and after the treatment

| Samples | Fabric direction | Width/ mm | Pros and cons | K/S | C* | Permeation ration/% | Electrostatic pressure/V | Half-life period/s | Breaking strength/N |
|---|---|---|---|---|---|---|---|---|---|
| Untreated | Wale | 1.37 | facade | 3.92 | 31.75 | 84.2 | 882 | 1.49 | 433 |
|  | Course | 1.14 | back | 3.30 | 33.00 |  |  |  | 1228 |
| Treated | Wale | 1.08 | facade | 4.40 | 35.79 | 76.9 | 575 | 0.83 | 434 |
|  | Course | 1.06 | bake | 3.46 | 34.35 |  |  |  | 1230 |

Table 2 showed that the properties of fabric before and after the treatment. It can be found that although the permeation ratio of fabrics reduced, the color of fabric front is similar to fabric back. The definition, colour depth, colour saturation and of antistatic ability pretreated fabrics were improved compared with untreated fabrics, while their breaking strength barely changed.

Example 3

110 g/m² warp-knitted polyester fabric was selected as sample, employing the process as follows:

(1) Preparation of the pretreating solution: 4 g antistatic agent Z-25, 10 g polyving akohol, 6 g SDBS, 180 g deionized water, mix and stir the above materials in a stirrer, revolving speed 800-1000 r/min, keep stirring for 30 min, then the pretreating solution was got;

(2) Padding pretreating solution: the polyester fabric was dipped into the pretreating bath, and squeezed with 60-100% liquid rate;

(3) Pre-dried and baking: the fabric was pre-dried at 60° C. and followed by 200° C. baking;

(4) Ink-jet printing: the water-based disperse dyes ink was used to printing under the condition of 720×540 dpi and 3 Pass;

(5) Sublimation and fixation: sublimation and fixation at 180° C. for 1 min.

Table 3 showed that the properties of fabric before and after the treatment. It can be found the permeation ratio of pretreated fabrics was reduced, and the pattern colour of pros and cons excited a huge difference compared with example 1 due to not adding nano-porous silicon dioxide dispersion. The fabric patterns' definition, colour depth, colour saturation, antistatic ability, breaking strength was not obviously improved.

Example 4

230 g/m² warp-knitted polyester fabric was selected as sample, employing the process as follows:

(1) Preparation of the nano-porous silicon dioxide dispersion: 12 g EPTMAC, 0.4 g Tween 60, 146 g deionized water, mix and stir the above materials in a stirrer, adding 40 g nano-porous silicon dioxide, keep stirring for 30 min, put the mixture in a sand mill and grinded for 2 h; then the nano-porous silicon dioxide dispersoid that contain 20% nano-porous silicon dioxide and the average size<200 nm was got;

(2) Preparation of the pretreating solution: 40 g nano-porous silicon dioxide dispersoid, 4 g antistatic agent TM, 4 g urethane-urea thickener, 6 g Tween 60, 146 g deionized water, stir the above materials in a stirrer and its speed is 800-1000 r/min, keep stirring for 30 min, then the fabric pretreating solution was got;

(3) Padding pretreating solution: the polyester fabric was dipped into the pretreating bath, and squeezed with 60-100% liquid rate;

(4) Pre-dried and baking: the fabric was pre-dried at 60° C. and followed by 200° C. baking;

(5) Ink-jet printing: the water-based disperse dyes ink was used to printing under the condition of 720×540 dpi and 3 Pass;

(6) Sublimation and fixation: sublimation and fixation at 180° C. for 1 min.

TABLE 3

The properties of fabric before and after the treatment

| samples | Fabric direction | Width/ mm | Pros and cons | K/S | C* | Permeation ration/% | Electrostatic pressure/V | Half-life period/s | Breaking strength/N |
|---|---|---|---|---|---|---|---|---|---|
| Untreated | Wale | 1.48 | facade | 5.19 | 34.23 | 95.8 | 725 | 2.13 | 403 |
|  | Course | 1.23 | back | 4.97 | 33.68 |  |  |  | 776 |
| Treated | Wale | 1.50 | facade | 5.65 | 33.26 | 68.5 | 714 | 1.98 | 398 |
|  | Course | 1.21 | bake | 2.87 | 32.56 |  |  |  | 764 |

TABLE 4

The properties of fabric before and after the treatment

| Samples | Fabric direction | Width/ mm | Electrostatic pressure/V | Half-life/S | Breaking strength/N | K/S M | Y | C | K | C* M | Y | C | K |
|---|---|---|---|---|---|---|---|---|---|---|---|---|---|
| Untreated | Wale | 1.52 | 764 | 2.52 | 794 | 9.22 | 9.51 | 8.74 | 10.46 | 55.54 | 67.44 | 36.76 | 8.45 |
|  | Course | 1.37 |  |  | 1398 |  |  |  |  |  |  |  |  |
| Treated | Wale | 1.13 | 573 | 0.92 | 795 | 11.26 | 18.55 | 12.77 | 14.92 | 62.30 | 83.72 | 42.64 | 4.82 |
|  | Course | 1.02 |  |  | 1259 |  |  |  |  |  |  |  |  |

As seen from the table 4, after the fabric was treated by pretreating solution, their definition and colour depth was improved obviously, the C* value of red, yellow and blue color were increased, their colour saturation was enhanced, the C* of black color was decreased, which means the colour of fabric surface was more purity. After the fabrics were treated by pretreating solution, their antistatic ability was enhanced, while its breaking strength barely changed.

Example 5

230 g/m² warp-knitted polyester fabric was selected as sample, employing the process as followed:

(1) Preparation of the nano-porous silicon dioxide dispersion: 12 g EPTMAC, 0.4 g Tween 60, 146 g deionized water, mix and stir the above materials in a stirrer, adding 40 g nano-porous silicon dioxide, keep stirring for 30 min, put the mixture in a sand mill and grinded for 2 h; then the nano-porous silicon dioxide dispersoid that contain 20% nano-porous silicon dioxide and the average size<200 nm was got;

(2) Preparation of the pretreating solution: 80 g nano-porous silicon dioxide dispersoid, 4 g antistatic agent TM, 6 g urethane-urea thickener, 6 g Tween 60, 104 g deionized water, stir the above materials in a stirrer, revolving speed 800-1000 r/min, keep stirring for 30 min, then the fabric spreadhead was got;

(3) Padding pretreating solution: the polyester fabric was dipped into the pretreating bath, and squeezed with 60-100% liquid rate;

(4) Pre-dried and baking: the fabric was pre-dried at 60° C. and followed by 200° C. baking;

(5) Ink-jet printing: the water-based disperse dyes ink was used to printing under the condition of 720×540 dpi and 3 Pass;

(6) Sublimation and fixation: sublimation and fixation at 180° C. for 1 min.

As seen from the table 5, after the fabric was treated by the pretreating solution, their definition and colour depth was improved obviously, the C* of red, yellow and blue color were increased, their colour saturation was enhanced, the C* of black were decreased, which means the colour of fabric surface was more purity. After the fabrics were treated by pretreating solution, their antistatic ability was enhanced, while its breaking strength barely changed.

Example 6

230 g/m² warp-knitted polyester fabric was selected as sample, employing the process as followed:

(1) Preparation of the pretreating solution: 4 g antistatic agent TM, 4 g urethane-urea thickener, 6 g Tween 60, 186 g deionized water, mix and stir the above materials in a stirrer, revolving speed 800-1000 r/min, keep stirring for 30 min, then the fabric spreadhead was got;

(2) Padding pretreating solution: the polyester fabric was dipped into the pretreating bath, and squeezed with 60-100% liquid rate;

(3) Pre-dried and baking: the fabric was pre-dried at 60° C. and followed by 200° C. baking;

(4) Ink-jet printing: the water-based disperse dyes ink was used to printing under the condition of 720×540 dpi and 3 Pass;

(5) Sublimation and fixation: sublimation and fixation at 180° C. for 1 min.

TABLE 5

The properties of fabric before and after the treatment

| Samples | Fabrics direction | Width/ mm | Electrostatic pressure/V | Half-life/S | Breaking strength/N | K/S M | Y | C | K | C* M | Y | C | K |
|---|---|---|---|---|---|---|---|---|---|---|---|---|---|
| Untreated | Wale | 1.52 | 798 | 2.78 | 794 | 9.22 | 9.51 | 8.74 | 10.46 | 55.54 | 67.44 | 36.76 | 8.45 |
|  | Course | 1.37 |  |  | 1398 |  |  |  |  |  |  |  |  |
| Treated | Wale | 1.21 | 564 | 0.76 | 783 | 11.62 | 18.35 | 11.09 | 15.36 | 59.78 | 79.35 | 41.20 | 5.18 |
|  | lateral | 1.09 |  |  | 1278 |  |  |  |  |  |  |  |  |

TABLE 6

The properties of fabric before and after the treatment

| Samples | Fabrics direction | Width/mm | Electrostatic pressure/V | Half-life/S | Breaking strength/N | K/S | | | | C* | | | |
|---|---|---|---|---|---|---|---|---|---|---|---|---|---|
| | | | | | | M | Y | C | K | M | Y | C | K |
| Untreated | Wale | 1.52 | 764 | 2.52 | 794 | 9.22 | 9.51 | 8.74 | 10.46 | 55.54 | 67.44 | 36.76 | 8.45 |
| | Course | 1.37 | | | 1398 | | | | | | | | |
| Treated | Wale | 1.13 | 735 | 2.32 | 789 | 9.03 | 10.76 | 9.04 | 11.21 | 56.43 | 65.42 | 35.98 | 7.86 |
| | Course | 1.02 | | | 1318 | | | | | | | | |

As seen from the table 6, compared with example 3, the pretreating solution didn't contain nano-porous silicon dioxide dispersoid, after the fabrics were treated by pretreating solution, its definition, colour depth, colour saturation and antistatic ability were barely improved.

What is claimed is:

1. A polyester fabric pretreating agent, comprising 10-50 wt % nano-porous oxide dispersoid, 1-4 wt % antistatic agent, 1-5 wt % thickening agent, 1-5 wt % wetting agent, and water; wherein the polyester fabric pretreating agent is configured to facilitate ink migration from one side of a fabric to another side of the fabric and to prevent ink from spreading; and wherein the antistatic agent is a non-ionic surface-active agent or anion surfactant.

2. The polyester fabric pretreating agent of claim 1, wherein the nano-porous oxide dispersoid is in an amount of 10-20 wt %, the antistatic agent is in an amount of 1-2 wt %, the thickening agent is in an amount of 2-5 wt %, and the wetting agent is in an amount of 3-5 wt %.

3. The polyester fabric pretreating agent of claim 1, wherein the thickener is a nonionic thickener.

4. The polyester fabric pretreating agent of claim 1, wherein the wetting agent is an anionic dispersant comprising one or more of sodium dodecyl benzene sulfonate (SDBS), sodium (C16-)alkylsulfonate, sodium (C18-)alkylsulfonate, alkylphenol polyoxyethylene ether sodium sulfate, alkyl polyoxyethylene ether carboxylate, or alkyl sodium sulfonate.

5. A polyester fabric pretreating agent, comprising 10-50 wt % nano-porous oxide dispersoid, 1-4 wt % antistatic agent, 1-5 wt % thickening agent, 1-5 wt % wetting agent, and water; wherein the pretreating agent is configured to prevent ink migration from one side of a fabric to another side of the fabric and to prevent ink from spreading beyond a target printing area; wherein the antistatic agent comprises an amine salt; or wherein the antistatic agent comprises an amine oxide.

6. The polyester fabric pretreating agent of claim 5, wherein the thickener is a nonionic thickener.

7. The polyester fabric pretreating agent of claim 5, wherein the nano-porous oxide dispersoid is in an amount of 30-40 wt %, the antistatic agent is in an amount of 2 wt %, the thickening agent is in an amount of 2-3 wt % and the wetting agent is in an amount of 2-3 wt %.

* * * * *